Dec. 18, 1951     W. R. DOUGLAS     2,578,926
AUTOMATIC SHUTOFF FOR FILLING SPOUTS
Filed Dec. 5, 1947
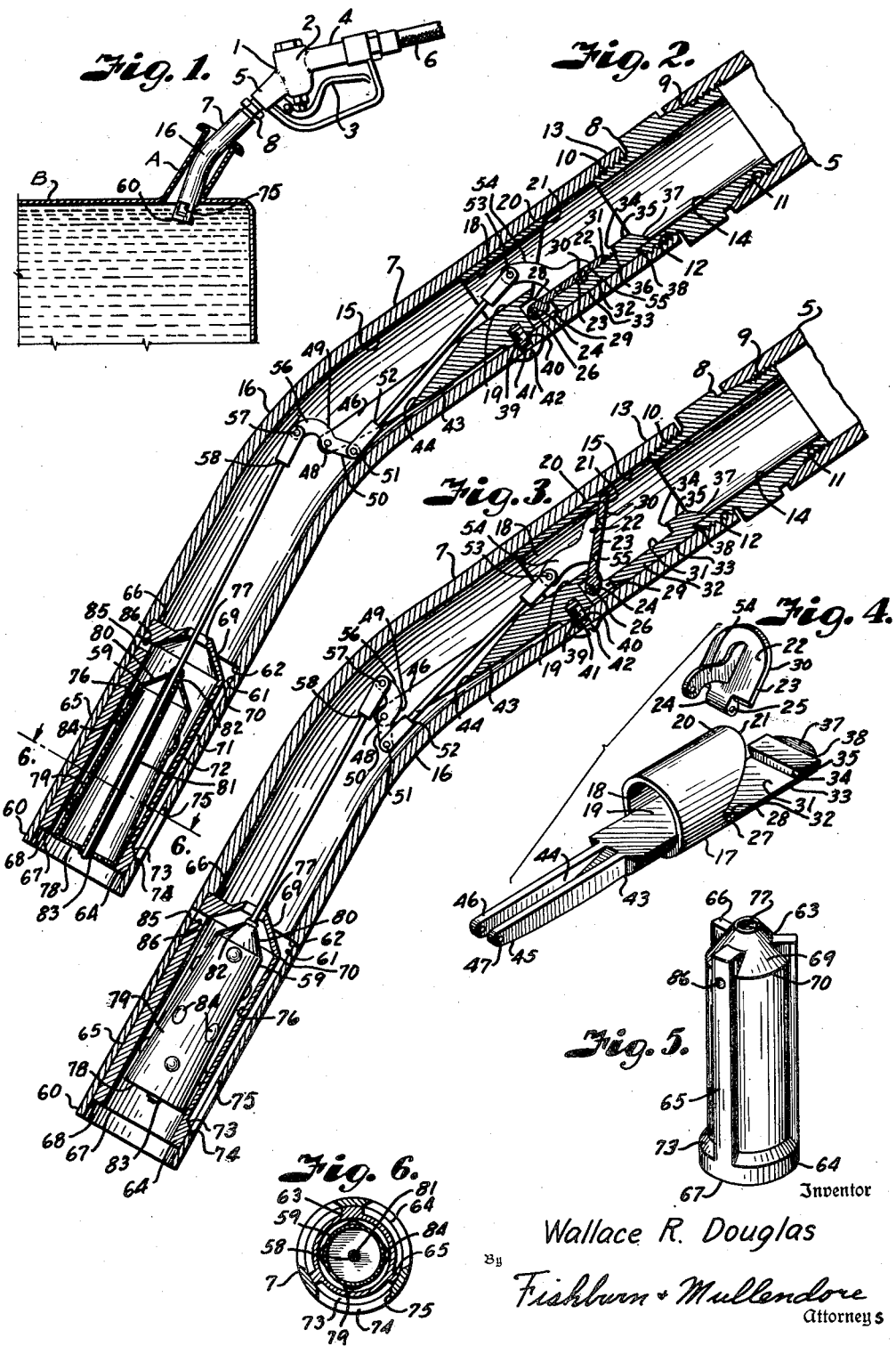
Inventor
Wallace R. Douglas
By Fishburn & Mullendore
Attorneys Patented Dec. 18, 1951

2,578,926

UNITED STATES PATENT OFFICE 2,578,926

AUTOMATIC SHUTOFF FOR FILLING SPOUTS

Wallace R. Douglas, Crete, Nebr.

Application December 5, 1947, Serial No. 789,865

3 Claims. (Cl. 226—127)

This invention relates to filling spouts of the type designed for use on the end of hose lines used for dispensing liquid as in automobile service stations or in refueling airplanes, and more particularly to a filling spout having an automatic shutoff of liquid flow when the level of liquid in the container being filled reaches a predetermined height relative to the spout.

The principal objects of my invention are to provide a filling spout with a float and lever operated valve for cutting off flow of liquid when the liquid level reaches a predetermined height relative to the spout, all of the operating parts being in the spout; to provide a positive valve control apparatus in an automatic shutoff filling spout whereby flow of liquid to the spout tends to maintain the valve open until the liquid reaches a predetermined level in the container and then said flow facilitates operation of the valve to shut off further flow; to provide an automatic shutoff filling spout assembly for use on conventional grip valve handles used on hose lines for dispensing liquid without alteration of said valve handles; to provide a valve assembly adapted for insertion as a unit into a curved spout; and to provide a shutoff valve of the character described that is relatively simple in construction having no springs, pawls, or dogs in the operating parts, that is inexpensive to manufacture and assemble and capable of efficiently and accurately shutting off flow of liquid through the spout when the level of liquid in the container being filled reaches a predetermined height relative to the spout.

In accomplishing these and other objects of the present invention, I have provided improved details of structure, the preferred form of which is illustrated in the accompanying drawings, wherein:

Fig. 1 is a side elevation of a filling spout of my improved construction applied to a conventional grip valve handle attached to a hose, said filling spout being shown inserted in a tank to be filled.

Fig. 2 is a longitudinal section through the filling spout, the shutoff valve being shown in open position to permit flow of liquid through said spout.

Fig. 3 is a longitudinal section similar to Fig. 2, the valve and operating structure being shown in flow shutoff position.

Fig. 4 is a detail disassembled perspective of the valve and valve body.

Fig. 5 is a detail perspective view of the float guide housing.

Fig. 6 is a transverse sectional view through the spout on the line 6—6, Fig. 2.

Referring more in detail to the drawings:

1 designates a conventional grip valve handle, the body 2 of which encloses a valve operated by a handle member 3 for controlling flow of liquid from an inlet fitting 4 to a discharge fitting 5 on opposite sides of the body 2. The inlet fitting 4 is suitably connected to a tubular hose 6 adapted to be connected to a suitable source of liquid supply such as a service station pump. A spout 7 is adapted to be connected to the discharge fitting 5 by means of a bushing 8 having oppositely directed threaded necks 9 and 10 screwed into threaded bores 11 and 12 of the discharge fitting 5 and the inlet end 13 of the spout 7 respectively. The bushing 8 is provided with a bore 14 forming a liquid flow passage from the discharge fitting 5 to the bore 15 of the spout 7. The spout 7 is preferably formed of tubular material and is curved as at 16 approximately midway of its length for facilitating insertion of the spout into the fill connection A of a container B to be filled with liquid.

Mounted in the bore 15 adjacent the inlet end 13 of the spout is a valve body 17 having the same exterior configuration and being substantially the same size as the cross-section of the bore 15 whereby said body engages said bore. The body member is provided with a passage 18 for liquid, the upper portion of said passage being arcuate in shape, the lower portion of said passage being a flat face 19, preferably spaced slightly below the longitudinal axis of the spout. The inlet end 20 of the body member is faced on an angle to the axis of the spout to form a seat 21 adapted to be engaged by the face 22 of a valve member 23 having a boss 24 provided with an aperture 25 for pivotally mounting the valve 23 on a pin 26 which extends through suitable apertures 27 in bosses 28 on each side of a recess 29 formed in the body member below and adjacent the inlet end of the passage 18. This mounting provides for swinging movement of the valve member whereby it may be moved into engagement with the seat 21 on the body member or may be swung whereby the opposite face 30 of said valve member will engage the flat surface 31 of an extension 32 on the inlet side and at the lower portion of the body member 17. The outer surface 33 of said extension is curved to closely engage the bore 15. The face 31 terminates in a shoulder 34 of a flange 35 at the inlet end of said extension 32, said shoulder 34 being spaced from the seat 21 whereby there is clearance 36 between said shoulder and the end of the valve member 23 when said valve member is engaged with the face 31. The flange 35 preferably extends toward the center of the bore 15 sufficiently that the shoulder 34 is slightly higher than the thickness of the valve member 23. The end of said flange on the inlet side is preferably sloped as at 37 to facilitate movement of liquid over the flange 35. The lower portion adjacent the end of the extension 32 is preferably curved and offset as at 38 on the outer surface 33 whereby the end of said extension extends into and engages the bore 14 of the bushing 8.

The lower portion of the body 17 is provided with a threaded aperture 39 adapted to align with an opening 40 in the wall of the spout 7 whereby the shank 41 of a screw 42 may be threaded into the aperture 39 to secure the body member in the spout as illustrated in Fig. 2. An arm 43 preferably integral with the body member 17 extends therefrom toward the curved portion of the spout. The arm terminates adjacent the inner section of the axes of the respective ends of the spout member and is slotted as at 44 to provide spaced ears 45 and 46 having apertures 47 adjacent the ends of said ears for receiving a pin 48 to pivotally mount a bell crank 49 between said ears. One arm 50 of said bell crank is pivotally connected by means of a pin 51 to a link 52, the other end of said link being connected by means of a pin 53 with an arm 54 suitably secured as at 55 to the valve member 23, the arrangement of the arms 50 and 54, link 52, and slots 44 being such that clearance is provided for movement of the respective members from full open to closed position of the valve member 23. The other arm 56 of the bell crank is pivotally connected by a pin 57 with one end of a rod 58 which carries a float member 59 on the other end thereof adjacent the discharge end 60 of the spout 7 as later described.

The discharge end 60 of the spout member is counterbored as at 61 providing a shoulder 62 at the inner end of said counterbore. Suitably secured in the counterbore is a float guide housing 63 preferably cylindrical in shape and provided with an enlarged portion 64 at the lower end thereof of substantially the same outside dimension as the bore 61 whereby the enlarged portion 64 is a press fit into the counterbore. The housing 63 is provided with ribs 65 extending upwardly from the enlarged portion 64 and terminating in a shoulder 66 adapted to engage the shoulder 62 in the tubular member 7, the length of the housing 63 being such that when the shoulder 66 engages the shoulder 62 the lower end 67 of said housing is spaced from the end of the tubular member 7 as at 68.

The upper end of the housing is provided with a frustro-conical wall 69 for directing liquid outwardly toward the walls of the tubular member 7, the lower end of the frustro-conical wall terminating as at 70 in spaced relation with the shoulder 62 to provide a liquid passage therebetween and through a space 71 between the cylindrical wall 72 of the housing and the counterbored portion of the wall of the spout member, the passage 71 terminating at the outwardly sloping upper edge 73 of the enlarged portion 64 which is in alignment with the lower edges 74 of ports 75 for discharge of liquid from the spout member. The housing 63 is provided with a bore 76 of sufficient size to accommodate the float member 59 and permit free sliding movement thereof in the bore 76. The bore 76 terminates at the conical wall 69 which is provided with an aperture 77 in the upper end thereof for passage of a float rod 58 pivotally connected to the arm 56 of the bell crank 49. The float member 59 is secured to the rod 58 by any suitable means, said float member preferably being formed of thin metal having a bottom member 78 and upwardly converging side walls 79 terminating in frustro-conical walls 80 at the upper end of the float. A tube 81 extends through the float member and is suitably sealed as at 82 and 83 in the conical wall 80 and the bottom wall 78. The rod 58 extends through the tube 81 whereby the rod may easily be positioned in the float member and secured thereto without alteration of the float member or possibility of puncture thereof. In order to reduce friction between the float member and the bore 76 in the housing 63, the side walls 79 of the float member preferably are provided with bosses 84, struck outwardly from the side walls whereby the bosses engage the housing and reduce the contact between the float and said housing walls. To prevent trapping of air in the upper portion of the float chamber formed by the bore 76, vents 85 and 86 are arranged through the walls of the tubular member 7 and the housing 63 respectively.

In using an automatic shutoff spout assembled as described, assuming a tank B is to be filled, the spout 7 is inserted into the fill opening A of the tank as shown in Fig. 1. The attendant or operator pulls upwardly on the control handle 3 thereby raising the valve in the grip valve handle to start flow of liquid from the hose 6 through the grip valve handle housing and spout 7. Normally the liquid in the tank will be below the end of the spout 7 and the weight of the float member will hold same in its lowermost position and by its connection with the valve member 23 will hold the valve open as shown in Fig. 2. The liquid passing from the discharge fitting of the grip valve handle will flow through the bore 14 of the bushing and through the bore 15 of the tubular spout member 7, the liquid passing through the opening 18 in the valve body 17. As the liquid engages the sloping surface 37, flow is deflected upwardly in the bore of the spout member, over the flange 35 and then downwardly into engagement with the valve member 23, this flow tending to hold the valve member in open position and counteract any forces resulting from the flow of liquid in the spout which might exert a closing force on the valve member 23. The liquid flows through the bore 15 of the spout, impinges on the frustro-conical end 69 of the housing 63 and is directed downwardly in the passage 71 between the ribs 65 and outwardly through the discharge openings 75 into the tank B. Flow will continue in this manner while the operator applies pressure to the handle 3 or until the level of the liquid in the tank B rises above the lower end of the spout 7 as shown in Fig. 1. Rising liquid in the tank will enter the bore 76 of the housing 63 to lift the float 59. The liquid may rise freely in the float chamber or bore 76 as the air in the upper portion thereof will escape through the apertures 85 and 86, the buoyancy of the float causing same to rise with the rise in the level of the liquid and exert a force through the rod 58 to pivot the bell crank 49 on the pivot 48 pulling the link 52 to exert a closing force through the arm 54 on the valve member 23. A slight lifting of the valve member will raise the end thereof upwardly above the flange 35 whereby flow of liquid will pass under the valve member and further increase the closing force acting thereon to snap said valve member into engagement with the valve seat 21 on the valve body 17, pressure of the liquid acting on the face 30 of said valve member 23, holding same in closed position, thereby substantially shutting off flow of liquid into the tank even though the control handle 3 is held by the operator. As the spout is raised from the fill opening A in the tank, gravitational forces acting on the float 59 will tend to swing the valve member 23 into open position.

It is not necessary for the valve member 23 to seat perfectly on the face 20 of the valve body as a slight leakage is not detrimental and may facilitate the opening of the valve as the end of the spout is raised above the level of liquid in the tank B. This device automatically cuts off flow of liquid into the tank, and permits the operator to fill the tank quicker as he does not have to exercise care to prevent overflowing the tank. When the liquid level in the tank actuates the device to automatically shut off flow through the spout, the operator can feel a distinct closing of the valve member 23. The operator then releases the control handle 3 and by lifting the spout from the fill opening remaining liquid therein will run into the tank. If desired, by lifting the spout from the tank and manipulating the control handle 3 the operator may fill the tank and a portion of the fill connection A thereby completing filling the container with liquid.

It is believed obvious that I have provided an automatic shutoff for filling spouts that is efficient in operation, inexpensive to manufacture and capable of substantially shutting off flow of liquid through said spout when the level of the liquid in the container being filled reaches a predetermined height relative to the spout.

What I claim and desire to secure by Letters Patent is:

1. A filling spout for use as a discharge fitting of valve controlled hose lines for dispensing liquids comprising, a tubular member having a flow passage therethrough, means for connecting one end of said tubular member to the hose line for flow of liquid from the hose line through the passage in said tubular member, a valve body in said flow passage having a cylindrical portion adapted to engage the walls of said flow passage, said valve member having a longitudinal opening extending therethrough, a valve seat around said opening on the inlet end of said cylindrical body sloping toward the inlet end of the tubular member at an angle to the axis of the cylindrical body, a valve member, means pivotally mounting the valve member on the valve body for swinging movement into engagement with the valve seat for substantially closing the opening in the valve body, an extension on the inlet end of the valve body at an acute angle to the valve seat and positioned for engagement with the valve member when in open position, means at the end of the extension and adjacent the free end of the open valve member for deflecting the flow of liquid therearound, a float in the discharge end of the tubular member, a float housing surrounding the float for deflecting flow of liquid therefrom, said housing having liquid flow passages therearound to the discharge end of said tubular member, and means connecting the float to the valve member whereby the float normally maintains the valve member in open position and movement of said float responsive to rise of level of liquid in the float housing moves the valve member into engagement with the valve seat to substantially interrupt flow of liquid through the spout.

2. A filling spout for use as a discharge fitting of valve controlled hose lines for dispensing liquid comprising, a tubular member having a flow passage therethrough, said tubular member having a curved portion intermediate the ends, means for connecting one end of said tubular member to the hose line for flow of liquid from the hose line through the passage in said tubular member, a valve body in the inlet end of said tubular member, said valve body having a flow passage therethrough, a valve seat on the inlet end of said valve body and sloping toward the inlet end of the tubular member at an angle to the axis of the valve body flow passage, a valve member, means pivotally mounting the valve member in said tubular member for swinging movement into engagement with the valve seat for substantially closing the flow passage in the valve body, a deflector on the valve body for directing liquid flow around the free end of the valve member when in open position, an arm on the valve body in the flow passage of the tubular member and extending toward and terminating adjacent the curved portion thereof, a bell crank pivotally mounted on the valve body arm adjacent the curved portion of said tubular member, a float in the discharge end of the tubular member, means connecting the float to one arm of the bell crank, and means connecting the other bell crank arm and valve member, whereby the float normally maintains the valve member in open position and movement of the float in response to rise of level of liquid around the float effects swinging movement of the valve member into engagement with the valve seat to substantially interrupt flow of liquid through the spout.

3. A filling spout for use as a discharge fitting of valve controlled hose lines for dispensing liquid comprising, a tubular member having a flow passage therethrough, said tubular member having a curved portion intermediate the ends, means for connecting one end of the tubular member to the hose line for flow of liquid from the hose line through the passage in said tubular member, a valve body having a cylindrical portion adapted to engage the walls of said flow passage on the inlet side of the curved portion of the tubular member, said valve body having a flow passage therethrough, means for securing the valve body in the flow passage of the tubular member, a valve seat on the inlet end of said cylindrical body and sloping toward the inlet end of the tubular member at an angle to the axis of the cylindrical body, a valve member, means pivotally mounting the valve member on the valve body for swinging movement into engagement with the valve seat for substantially closing the flow passage in the valve body, an extension on the inlet end of the valve body at an acute angle to the valve seat and positioned for engagement with the valve member when in open position, means on the extension adjacent the free end of the open valve member for deflecting the flow of liquid therefrom, an arm on the valve body in the flow passage of the tubular member and extending toward and terminating adjacent the curved portion thereof, a bell crank pivotally mounted on the valve body arm adjacent the curved portion of the tubular member, a float in the discharge end of the tubular member, a float housing surrounding the float for deflecting flowing liquid therefrom, said housing having a liquid flow passage for passage of liquid therearound to the discharge of said tubular member, means connecting the float to one arm of the bell crank, means connecting the other bell crank arm to the valve member, whereby the float normally maintains the valve member in open position and rise of level of liquid in the float housing moves the float to move the valve member into engagement with the valve seat, and means for venting the float housing to permit liquid to rise therein.

WALLACE R. DOUGLAS.

REFERENCES CITED

The following references are of record in the file of this patent:

UNITED STATES PATENTS

| Number | Name | Date |
| --- | --- | --- |
| Re. 11,600 | Goodlett | May 4, 1897 |
| 423,577 | Siersdorfer | Mar. 18, 1890 |
| 1,400,275 | Fisk | Dec. 13, 1921 |
| 1,539,081 | Fritz | May 26, 1925 |
| 1,923,574 | Hansen | Aug. 22, 1933 |
| 1,930,954 | Hansen | Oct. 17, 1933 |

FOREIGN PATENTS

| Number | Country | Date |
| --- | --- | --- |
| 14,165 | Austria | Nov. 25, 1903 |